United States Patent Office 3,375,890
Patented Apr. 2, 1968

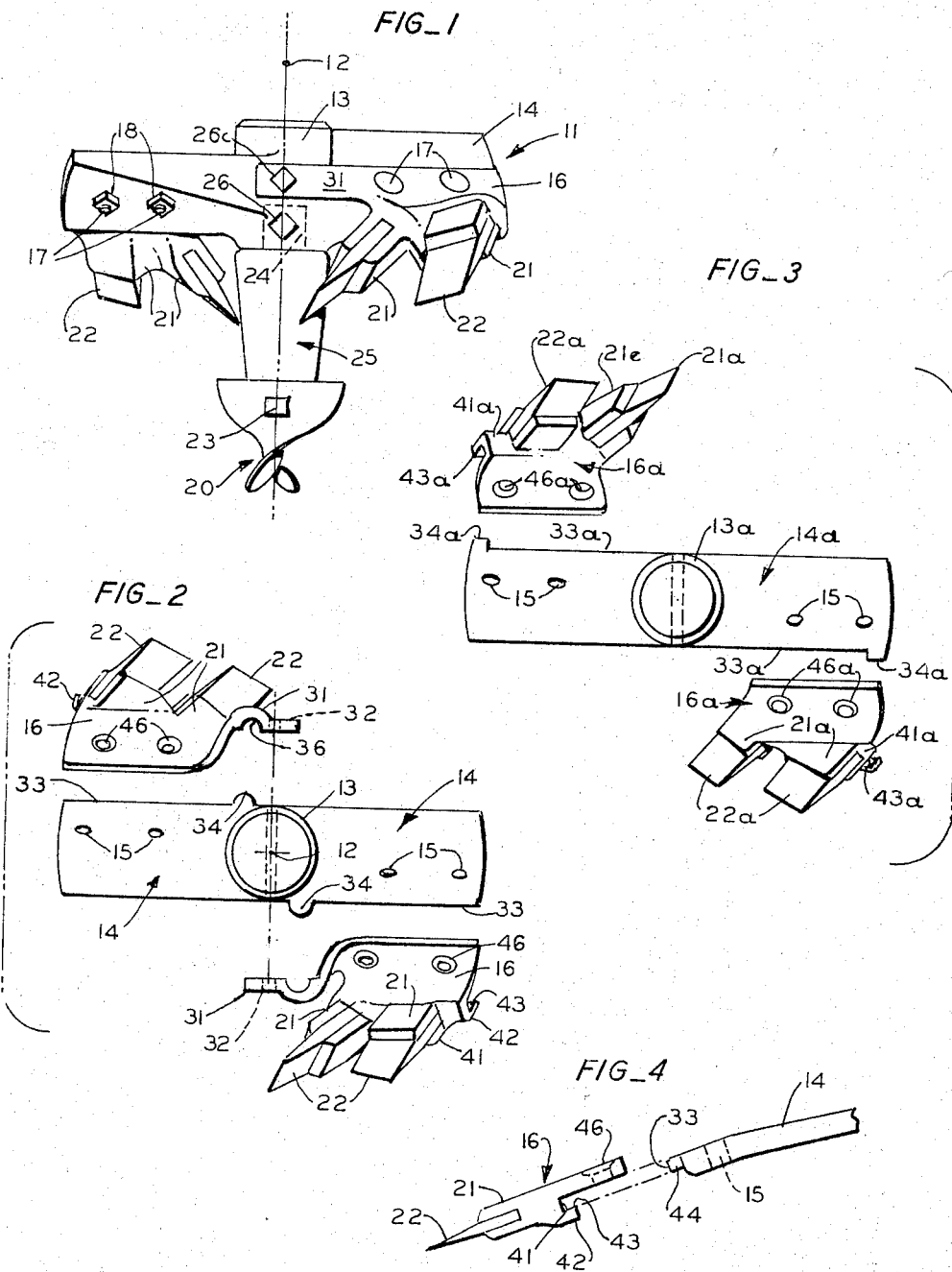

3,375,890
EARTH AUGER CONSTRUCTION
Gerald A. Petersen, Sunnyvale, Calif., assignor of one-half to Anita E. Petersen, Saratoga, Calif.
Filed Dec. 20, 1965, Ser. No. 514,883
5 Claims. (Cl. 175—385)

ABSTRACT OF THE DISCLOSURE

An auger shank plate having means for attachment of auger teeth is fastened to an auger head. Side and leverage stresses are imposed on the fastening means. The side thrust is resisted by lugs on the head fitting in sockets on the plates and the plate being formed with an extension overlapping the head hub with a bolt through the hub and extension. The leverage stress is resisted by forming the trailing edge of the plate with a rearward facing channel into which the leading edge of the head tightly fits.

---

This invention relates to a new and improved auger construction wherein the auger head and detachable shank plate are formed with complementary means to resist both the side thrust and leverage action imposed upon the means for securing the two members to each other. More particularly, the invention relates to improved means for attachment of flat, apertured members (termed herein "shank plates") having one or more tooth holders incorporated therein, which shank plates are bolted to auger heads or auger flights. Reference is made to Petersen Patent No. 2,578,014, showing a pair of shank plates, each having a plurality of tooth holders which are shaped to mate with cooperating proximal portions of replaceable teeth. The shank plates are semi-permanent parts of the assembly, in that they need be replaced only seldom, as compared with the frequently replaced teeth which absorb the major portion of the abrasion to which the auger is subjected in digging. On the other hand, shank plates must sometimes be replaced and accordingly they are commonly bolted or otherwise detachably fastened to an auger head, such as shown in Petersen Patent No. 2,863,-640, which is permanently fastened (as by welding) to the lower end of an auger flight, to an auger stem, or otherwise mounted for rotation. In light auger construction the shank plate may be bolted to the apertured end of the auger flight and the term "head" is intended to include a portion of the auger flight in such construction.

The present invention is concerned with an improved construction whereby the shank plate is attached to the auger head. A principal object of the present invention is to reduce the strain to which the bolts or other fastening means holding the shank plate to the auger head are subjected in normal usage of the equipment. As is amply illustrated in Patent No. 2,578,014, and as commonly practiced in the art to which this invention pertains, the teeth held by the shank plate are disposed at various angles and inclinations in order to best perform the digging function. Accordingly, stresses are applied to the shank plate and transmitted to the auger head which apply strain both in tension and in shear to the bolts holding the parts together. The features of the invention hereinafter described reduce such strain.

One of the stresses applied to the bolts results from forces tending to move the shank plate in an outward or inward direction across the end of the auger head and are termed herein "side thrust." Such forces may be directed either inwardly or outwardly, but in conventional practice are generally directed outwardly and are occasioned by the component of the vector of force applied to the tooth as the auger turns resulting from the oblique angle of the tooth relative to the edge of the auger head. The present invention resists such thrust and relieves such stresses on the fastening means.

A second stress imposed upon the fastening means holding the shank plate on the head is a lever action whereby the downward pressure on the teeth resulting from digging is balanced by tension on the bolts, with the edge of the auger head functioning as a fulcrum upon which the shank plate is balanced in a lever of the first class system. This stress is also resisted by the structure of the present invention.

One feature of the present invention provides lugs on the leading edge of the auger head restraining movement of the shank plate relative to the end edge of the head. Such lugs absorb some of the shear stress which would otherwise be imposed on the bolts.

A second feature of the invention is the formation of a shallow channel on the shank plate into which the leading edge of the auger head fits. Such channel serves as a socket preventing the lever action heretofore mentioned, thus absorbing in the shank plate and head themselves forces which would otherwise be transmitted to the fastening means.

A still further feature of the invention is the provision of a bolted shank plate and auger head combination structure wherein, in addition to the usual bolts heretofore mentioned, there is further provided one or more additional bolts which extend transversely through the axis of rotation of the auger and function thereby to assist in holding the shank plates and auger head together. Such bolt or bolts may perform an additional function, in accordance with the invention. Thus it is customary to provide a pilot bit on the lower end of the auger which is of lesser diameter than the auger head and assists in maintaining the boring action in a straight line. Frequently, in order to space the pilot bit downward from the auger head an adaptor is interposed between the head and the pilot bit. In accordance with the present invention, the bolt which passes transversely through the axis of rotation of the auger also, in addition to the functions heretofore described, fastens the pilot bit extension to the auger head. Where no pilot bit extension is employed said bolt may fasten the pilot bit to the auger head. The use of a bolt transversely through the axis, particularly in combination with lugs on the auger head bearing against and resisting side thrust of the shank plate materially decreases the stress which must be borne by the conventional bolts fastening the shank plate to the head.

Other objects of the present invention will become apparent upon reading the following specification and referring to the accompanying drawings in which similar characters of reference represent corresponding parts in each of the several views.

In the drawings:

FIG. 1 is a front elevational view in accordance with one modification of the present invention, showing bolts extending transversely of the axis of rotation holding in position a pair of shank plates, an auger head and a pilot bit extension.

FIG. 2 is an exploded top plan view of a portion of the structure of FIG. 1.

FIG. 3 is an exploded plan view of a modification, showing a channel formed in the shank plate shaped to receive the leading edge of the auger head, the latter being provided with lugs to resist side thrust.

FIG. 4 is an exploded view of a portion of the structure of FIG. 3, showing the interfitting of the leading edge of the head in the channel in the shank plate. FIG. 4 also illustrates a corresponding portion of the structure of FIGS. 1 and 2.

FIG. 1 illustrates an auger 11, rotatable about an axis of rotation 12 which is normally vertically disposed.

Auger 11 is provided with a socket 13 which receives an auger shaft (not shown), or is welded to the lower end thereof. Socket 13 comprises a hub from which extend opposed radial arms 14 comprising the auger head. One or both arms 14 may be welded or otherwise suitably attached to the lower end of a single or double auger flight, as is well understood in this art. Attached to each of the arms 14 is a shank plate 16, the head 14 and plate 16 being apertured in holes 15 and 46, respectively, and receiving bolts 17 held in place by nuts 18. A principal object of the present invention is to reduce the strain in tension and in shear on the bolts 17. Each of the shank plates 16 carries a plurality of tooth-holders 21, each receiving the proximal end of a tooth 22. The means whereby teeth 22 are held in holders 21 forms no part of the present invention, but reference is made to Patent No. 2,968,880 showing a preferred means to accomplish such result. The number of teeth 22, their shape and their disposition are subject to wide variation. In accordance with copending application Ser. No. 383,464 of William M. Troeppl, now Patent 3,235,018, the teeth on one of the shank plates of the auger head may be at a lower elevation than the teeth on the other, but this is an optional feature. Patent No. 2,578,014 describes in detail a preferred arrangement of the teeth to accomplish digging action, and such arrangement has led to widespread commercial success. It will be noted that the angles assumed by teeth 22 in working position transmit forces to holder 21 and thence to shank plate 16 which have components acting in at least two directions which are normally resisted by bolts 17. One such component is an outward side thrust whereby the shank plate 16 tends to be forced outwardly across the end of head 14 toward the wall of the hole being dug and away from axis 12. Such force will be termed a "side thrust." A second force is a downward force upon the points of the teeth. Since the forward edge 33 of head 14 bears on the underside of shank plate 16, said forward edge 33 functions as a fulcrum and a first class lever system is created applying tension on bolts 17. Such second force may be termed a "rocking force." It is principal purpose of the invention to resist both the side thrust and the rocking force acting upon each bolt 17, or equivalent fastening means.

In the form of the invention shown in FIGS. 1 and 2, there is provided a pilot bit 20 which may be of the type shown in Patent No. 2,639,122. Such a bit frequently has a pilot bit extension 25 secured thereto by means of bolt 23, which increases the distance between bit 20 and head 11, or where such wide spacing is not required, the bit 20 itself may have an upward extension. In any event, there is frequently provided a reduced diameter apertured stud 24 integral with the extension 22 or with bit 20, which is received in hub 13 and bolted thereto by means of bolt 26 which passes through hub 13 transversely with respect to axis 12.

In the form of the invention shown in FIGS. 1 and 2, shank plates 16 have inward extensions 31, each formed with a hole 32 adjacent the inner end to receive bolt 26. Extensions 31 are on diametrically opposite sides of head 14 and in close proximity to hub 13 and hence bolt 26 may pass through both holes 32 or, as best shown in FIG. 1, two separate bolts 26, 26c may be employed for this purpose to secure the vertically spaced or staggered shank plates 16. Reference numerals 33 indicate the two opposite leading edges of head 14, being located on opposite sides of axis 12. To resist side thrust of shank plate 16, each leading edge 33 is formed with a lug 34 and each extension 31 is formed with a socket 36 into which lug 34 fits. When the shank plates are bolted to the head, the interfitting of lugs 34 and sockets 36 assists in resisting outward displacement and thus relieves the side thrust imposed on bolts 17 and 26.

A further feature of the invention shown in FIGS. 1 and 2 is also illustrated in FIG. 4. Thus plate 16 is formed with a downward extending shoulder 41 and a reversely directed lip 42 which is spaced below plate 16, and thus define a shallow, rearward opening channel 43. Head 14 at its leading edge 33 is formed with a reduced thickness portion indicated by reference numeral 44, which fits tightly into channel 43. When downward pressure is applied to tooth 22 as a result of the digging action, the upper corner of leading edge 33 tends to act as a fulcrum so that an upward force results in the region indicated by holes 46 through which bolts 17 pass. The stress thus imposed on bolts 17 is lessened by reason of portion 44 fitting into channel 43.

The modification shown in FIG. 3 resembles that heretofore described, except that the extensions 31 are eliminated. Lugs 34a are formed adjacent the outer extremities of leading edges 33 and such lugs engage the outer edges of shank plate 16 and more specifically, engage the outer edges of shoulders 41a. Thus side thrust tending to move shank plate 16a outwardly relative to head 14a is resisted by lugs 34a. In various other respects the structure shown in FIG. 3 resembles that shown in the previous modification and the same reference numerals followed by the subscript $a$ are used to designate corresponding parts.

In the foregoing description, it will be seen that the present invention provides structure to relieve bolts 17 from the shear and tension stresses under severe operating conditions imposed on augers constructed in accordance with the prior art.

In the form of the invention shown in FIG. 1, the opposite sides of the auger are "stepped" in that the teeth on one side of the auger are lower than those on the opposite side. Application Ser. No. 383,464 illustrates stepped constructions and the means whereby they may be accomplished. As has been stated, in FIG. 1 two bolts 26, 26c are used to secure extensions 31 because said extensions are at different elevations. It will be understood, however, that the stepped construction of the auger is optional and if not used in a single bolt 26 may pass through holes 32 in both extensions 31. Further, as illustrated in FIGS. 7 and 8 of Ser. No. 383,464, the stepped auger construction may be accomplished by the construction of the shank plates; in other words, one may be depressed relative to the other and in such event the opposed arms of the auger head are essentially at the same elevation. Here again, a single bolt 26 may be used to secure both extensions 31 at a single elevation despite the fact that the teeth themselves are stepped.

Although the foregoing invention has been described in some detail, by way of illustration and example for purposes of clarity of understanding, it is understood that certain changes and modifications may be practiced within the spirit of the invention and scope of the appended claims.

What is claimed is:

1. In an earth auger construction, a rotatable head, a shank plate, at least one tooth-holder on said shank plate, a tooth in said tooth-holder, said tooth held relative to said head whereby a component of force imposed on said tooth as said head rotates is transmitted to said head as side thrust, fastening means for securing said shank plate to said head, said fastening means normally subject to said side thrust, and a lug on the leading edge of said head engaging said shank plate and resisting said side thrust whereby stress on said fastening means resulting from side thrust is reduced, said head being formed with a central hub apertured transversely of the axis of rotation of said auger, said shank plate being formed with an apertured inward extension overlapping said hub, and a bolt through the apertures in said extension and said hub, said bolt absorbing a portion of said side thrust.

2. A construction according to claim 1, which further comprises a pilot bit and apertured pilot bit attachment means, said bolt also passing through the aperture in said pilot bit attachment means.

3. A construction according to claim 1, in which said extension is formed with a socket, said socket receiving said lug.

4. A construction according to claim 1, in which said fastening means is subjected to tension from a lever action imposed on said shank plate with the leading edge of said head functioning as a fulcrum of the trailing edge of said lever action, said shank plate formed with a shallow, rearward facing channel and partially overlapping said head, said channel defined by the underside of said shank plate, a downward extending shoulder on the outer edge of said shank plate, and a reversely directed lip on the lower edge of said shoulder, the leading edge of said head shaped to fit tightly in said channel between said underside and said lip and abutting said shoulder to resist imposition of said lever action on said fastening means.

5. In an earth auger construction, a rotatable head, a shank plate, at least one tooth-holder on said shank plate, a tooth in said tooth-holder, said shank plate partially overlapping said head, fastening means passing through apertures in said head and shank plate, said fastening means subjected to tension resulting from lever action imposed by forces acting on said teeth, the leading edge of said head bearing against the trailing edge of said shank plate and functioning as a fulcrum for said lever action, said trailing edge of said shank plate formed with a shallow, rearward facing channel, said channel defined by the underside of said shank plate, a downward extending shoulder on the outer edge of said shank plate, and a reversely directed lip on the lower edge of said shoulder, the leading edge of said head shaped to fit tightly within said channel between said underside and said lip and abutting said shoulder to resist said lever action.

References Cited

UNITED STATES PATENTS

| | | | |
|---|---|---|---|
| 513,541 | 1/1894 | Snyder | 175—385 X |
| 537,287 | 4/1895 | Hardsocg | 175—385 |
| 1,826,087 | 10/1931 | Newman | 175—413 X |
| 2,886,292 | 5/1959 | Petersen | 175—413 |
| 2,952,085 | 6/1960 | Petersen | 175—413 X |

CHARLES E. O'CONNELL, *Primary Examiner.*

NILE C. BYERS, JR., *Examiner.*